United States Patent [19]

Glenn, Sr.

[11] Patent Number: 5,399,625

[45] Date of Patent: Mar. 21, 1995

[54] PROCESS FOR PREPARATION OF 2-CHLORO-1,3-BUTADIENE GRAFT COPOLYMERS

[75] Inventor: Furman E. Glenn, Sr., Louisville, Ky.

[73] Assignee: E. I. Du Pont de Nemours and Company, Wilmington, Del.

[21] Appl. No.: 163,386

[22] Filed: Dec. 7, 1993

[51] Int. Cl.$^6$ .................... C08F 265/06; C08F 279/02
[52] U.S. Cl. .................... 525/292; 525/309; 525/310
[58] Field of Search .......... 525/292, 309, 310

[56] References Cited

U.S. PATENT DOCUMENTS 3,728,316  4/1973  Simons.

FOREIGN PATENT DOCUMENTS 1766931  10/1992  U.S.S.R. .

OTHER PUBLICATIONS

Japanese Patent Application Kokai No. 61-275315, published May 12, 1986.
Japanese Patent Application Kokai No. 01-284544, published Nov. 15, 1989.

*Primary Examiner*—Vasu S. Jagannathan
*Attorney, Agent, or Firm*—Marilyn H. Bromels

[57] ABSTRACT

Graft copolymers of chloroprene and alkyl or cycloalkyl esters of unsaturated acids are prepared in a one-stage programmed temperature process.

11 Claims, No Drawings

PROCESS FOR PREPARATION OF 2-CHLORO-1,3-BUTADIENE GRAFT COPOLYMERS

BACKGROUND OF THE INVENTION

This invention relates to preparation of polymers having copolymerized units of 2-chloro-1,3-butadiene and alkyl, hydroxyalkyl, or cycloalkyl esters of unsaturated monocarboxylic acids.

Graft copolymers of 2-chloro-1,3-butadiene (chloroprene) and alkyl acrylates or alkyl methacrylates have found utility in a variety of solvent and latex adhesive applications, particularly in the manufacture of shoes. Such copolymer compositions form strong bonds to polyvinyl chloride, polyurethane, and nylon substrates. In addition, they are unusually resistant to certain plasticizers commonly used in the footwear industry.

The copolymers may be prepared by a variety of methods, but, generally, industrial scale preparation consists of graft polymerization in a high temperature bulk solution process. That is, a polychloroprene base polymer is dissolved in an organic solvent and alkyl acrylate or alkyl methacrylate monomers are introduced in the presence of a free radical initiator at temperatures above 80° C. Other methods have also been disclosed in the prior art, for example, in U.S. Pat. No. 3,728,316; Japanese Patent Application Kokai 61-275315; and Japanese Patent Application Kokai 1-284544, wherein aqueous emulsion processes are utilized to prepare chloroprene/alkyl acrylate or chloroprene/alkyl methacrylate graft copolymers.

Whether prepared by solution or emulsion processes, the resultant products have backbones composed of copolymerized units of chloroprene and alkyl acrylates or alkyl methacrylates. In addition, the copolymers contain grafted side-chains derived from the alkyl acrylate or alkyl methacrylate.

Due to environmental and health concerns, the use of solvent processes is increasingly disfavored. Therefore, it would be desirable to have available an efficient emulsion process for preparation of chloroprene/alkyl acrylate and chloroprene/alkyl methacrylate graft copolymers. Unfortunately, the emulsion processes of the prior art are either inherently inefficient or suffer from other significant disadvantages. For example, the preferred method for preparation of graft polymers would be a single stage process. However, in order to realize the efficiencies necessary for industrial scale production in single-stage reactions of the prior art, reaction temperatures of at least about 35° C. have been required. Use of such high temperatures has the undesirable effect of producing discolored products. The less preferred multi-stage emulsion copolymerization processes exhibit other disadvantages, even though it is possible to operate such processes at low or moderate temperatures in a first stage. In a typical multi-stage reaction, the first copolymerization stage is followed by removal of unreacted monomers. In a further step, conducted at a higher temperature, generally in excess of 80° C., additional acrylate or methacrylate monomer is supplied to the reaction mixture resulting in grafting of acrylate or methacrylate monomer onto the copolymer backbone. Such multi-stage processes require long cycle times, complex reaction schemes, and complicated comonomer addition facilities. In addition, the emulsion is subjected to shear and thermal stresses resulting from transfer among vessels and heating in the intermediate phase wherein residual monomer is removed. This combination of shear and thermal stress results in polymer discoloration and degradation of polymer properties.

The present invention overcomes these problems by providing an improved single-stage reaction which produces non-discolored chloroprene/ester graft copolymers, such as chloroprene/alkyl acrylate or chloroprene/alkyl methacrylate graft copolymers in a highly efficient manner. By employing a particular method of temperature regulation in conjunction with control of monomer conversion, non-discolored products are produced without the disadvantages associated with a multi-stage process.

SUMMARY OF THE INVENTION

In particular, the present invention is directed to a process for preparation of an addition polymer comprising copolymerized backbone units of 2-chloro-1,3-butadiene and at least one ester of the formula

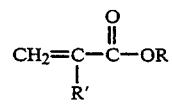

wherein R' is H or an unbranched alkyl radical having 1–4 carbon atoms, and R is an alkyl, hydroxyalkyl, or cycloalkyl radical having 1–12 carbon atoms, with additional units of said monomer grafted onto the copolymer backbone, said process comprising a) preparing an aqueous emulsion of a mixture comprising said ester and 2-chloro-1,3-butadiene, in a weight ratio of 5–100 parts ester per 100 parts 2-chloro-1,3-butadiene, in an inert atmosphere, in the presence of a free radical generator and an anionic surfactant, and at a temperature no greater than 25° C.;

b) allowing polymerization of said ester and 2-chloro-1,3-butadiene to proceed until 35–90 weight percent of the ester has copolymerized;

c) raising the temperature of the emulsion to at least 35° C.; and d) continuing the polymerization at a temperature of at least 35° C., without further addition of any substantial amount of said ester, until at least 90% of said ester has reacted.

DETAILED DESCRIPTION OF THE INVENTION

The present invention provides an improved one-stage aqueous emulsion process for preparation of graft copolymers of 2-chloro-1,3-butadiene (chloroprene) and at least one alkyl, hydroxyalkyl, or cycloalkyl ester of an unsaturated monocarboxylic acid. The polymerization itself may be characterized as consisting of two discrete steps. In the first step, addition copolymerization of the comonomers takes place, while in the second step, grafting of units of the ester monomer onto the copolymer backbone occurs. Copolymerization generally predominates in the early stages of the polymerization because of the high reactivity of the chloroprene monomer, but some simultaneous copolymerization and grafting takes place.

Although there are two reactive steps in the graft copolymerization, the process of the present invention is carried out in one stage. That is, the comonomers are introduced prior to initiation of the polymerization and no substantial addition of further quantities of monomer occurs after initiation. This is in contrast to multi-stage reactions which might include, for example, initial copolymerization at a relatively low temperature, in the presence of a given amount of an alkyl acrylate or alkyl methacrylate monomer, followed by stripping of excess monomer, increase of reaction temperature, and introduction of a further substantial quantity of acrylate or methacrylate monomer.

In the present invention, 5–100 parts of at least one ester monomer are generally introduced to the polymerization vessel per 100 parts of chloroprene monomer. The ester monomers are compounds of the formula

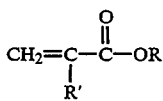

wherein R' is H or an unbranched alkyl radical having 1–4 carbon atoms, and R is an alkyl, hydroxyalkyl, or cycloalkyl radical having 1–12 carbon atoms. Examples of such compounds include methyl acrylate, ethyl acrylate, n-butyl acrylate, methyl 2-ethyl-2-propenoate, 2-ethylhexyl acrylate, hydroxyethyl methacrylate, methyl methacrylate, ethyl methacrylate, n-butyl methacrylate, n-propyl methacrylate, 2-ethylhexyl methacrylate, isobutyl methacrylate, tetrahydrofurfuryl methacrylate, cyclohexyl methacrylate, and isobornyl methacrylate. Methyl methacrylate, ethyl methacrylate, isobutyl methacrylate, and n-butyl methacrylate are preferred because adhesive performance of compositions prepared by the process of the invention is enhanced. If less than 5 parts of unsaturated ester is used per 100 parts chloroprene, the properties of the copolymer do not differ substantially from those of a chloroprene homopolymer. For example, the adhesion characteristics of such compositions are not improved relative to polychloroprene homopolymer adhesives. This is particularly true in the case of adhesion to polyvinyl chloride. Conversely, if the unsaturated ester is present in the reaction mixture at levels above 100 parts per 100 parts chloroprene, adhesives prepared from the resultant copolymers require excessive pressures to form an adhesive bond. Preferably, 10–50 parts per hundred parts total monomer of unsaturated ester are present because within this range "quick grab", i.e. the bond strength which is developed within one minute of bonding, and long-term bond strength of adhesive compositions prepared from the latexes are optimized. The monomer mixture may also include minor amounts of other copolymerizable monomers such as 2,3-dichloro-1,3-butadiene, styrene, acrylonitrile, 1,3-butadiene, and methacrylic acid. Such monomers may be present in amounts of up to 20 parts per 100 parts chloroprene. An anionic surfactant is also present in the polymerization emulsion, and, preferably, a molecular weight regulator, i.e. a modifying agent or chain transfer agent, is also used.

The anionic surfactant used is one wherein the cation has one of the following structures: triethanolammonium, tri(2-propanol)ammonium, diethanolammonium, and $C_1$–$C_3$ alkyldiethanolammonium. The anions of the surfactants are preferably derived from strong acids, such as organic sulfonic acids, and sulfate esters. Preferred surfactants are triethanolammonium dodecylbenzenesulfonate, and diethanolammonium dodecylbenzenesulfonate. Generally 1–6 parts of the surfactant, preferably 2–5 parts, are used per 100 parts total monomer.

The reaction is carried out in the presence of a polymerization initiator, preferably based on a redox pair. Typical redox pairs include sodium sulfite/potassium persulfate, ammonium persulfate/sodium bisulfite, and potassium persulfate/sodium metabisulfite.

The modifier, when present, prevents formation of copolymers of very high molecular weight which tend to be crosslinked and insoluble, i.e. gel. Alkyl mercaptan modifiers suitable for use in the preparation of the copolymers generally have chain lengths of from about 4–20 carbon atoms. The alkyl radicals may be straight-chained or branched, and they may be primary, secondary, or tertiary. It is preferred that the alkyl radicals have about 8–16 carbon atoms. Examples include octyl mercaptan, dodecyl mercaptan, tert-dodecyl mercaptan, tridecyl mercaptan, and mixtures of mercaptans derived from coconut oil. Dodecyl mercaptan is particularly preferred. Dialkylxanthogen disulfide chain transfer agents may also be used for modifying the chloroprene copolymer. These compounds can be represented by the formula

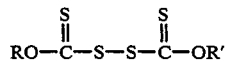

wherein R and R' are alkyl radicals having one to eight carbon atoms. Examples of suitable alkyl radicals are methyl, ethyl, propyl, isopropyl, and the various isomeric butyl, amyl, hexyl, heptyl, and octyl radicals. Preferred dialkylxanthogen disulfides are those in which each alkyl radical has 1 to 4 carbon atoms. Diisopropylxanthogen disulfide is particularly preferred because it has a lower toxicity than other dialkylxanthogen disulfides while maintaining good efficiency. Dialkoxyxanthogen disulfide modifiers may also be employed. These compounds are compositions of the formula

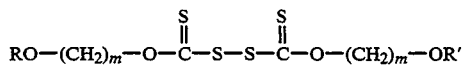

wherein R and R' are independently hydrogen, alkyl radicals having 1–8 carbon atoms, or an oxygen-containing heterocyclic ring system having from 5 to 6 ring members and m is 2 to 6. Examples of suitable alkyl radicals are methyl, ethyl, butyl, and hexyl. A preferred heterocyclic R group is 5-ethyl-1,3-dioxan-5-yl-methyl. Generally, the modifier content of the polymer is from 0.05–0.8 weight percent and preferably the range is 0.1–0.25 wt. %. At least 0.05 parts, preferably 0.1–0.25 parts, of chain transfer agent per 100 parts monomer are used during the polymerization in order to control polymer viscosity and gel content. The maximum amount of chain transfer agent that may be used to produce polymers of the desired viscosity is 0.8 parts per 100 parts of monomer.

Polymerization is performed in an inert atmosphere, free of oxygen, usually at atmospheric pressure. The polymerization is initiated at a temperature no greater than 25° C., preferably at a temperature of 5°–20° C., and polymerization is allowed to occur until 35–90 wt. %, preferably 40–60 wt. %, of the ester monomer has polymerized. Degree of polymerization is determined by gas chromatographic analysis or specific gravity measurement of the polymerizing emulsion. After the desired degree of polymerization has been attained, the temperature of the reaction mixture is raised to at least 35° C., preferably 45°-55° C., and polymerization is allowed to continue, without the addition of any substantial further quantity of monomers, until at least 90% percent of the ester monomer, preferably at least 99%, has reacted as determined by gas chromatographic analysis. The higher monomer conversions are preferable because the amount of toxic and malodorous residual organic compounds is thereby minimized.

A significant feature of the present invention is that polymerization is initially conducted at a low temperature until 35-90 wt. % of ester monomer is copolymerized. It has been found that when the temperature of polymerization is maintained at a temperature no greater than 25° C. during the initial phase of the copolymerization discoloration of the product is prevented. If higher temperatures are used, polymer isolated from the latex will yellow on aging at room temperature or on exposure to light. This is observed for both dry polymer isolated from the latex using a freeze roll process or polymer formed by evaporation of the latex in dipping processes or adhesive applications. It is preferable to operate at temperatures between 5°-20° C. because the amount of crystallinity of the polymer is thereby enhanced and the production of color-forming chromophores is reduced. Also, it is preferable to polymerize only 40-60% of the ester monomer or monomers at low temperature because cycle time is reduced without affecting color stability.

After at least 35% of the ester monomer or monomers have been copolymerized, the polymerization temperature may be raised without danger of causing the product to discolor. The use of the higher polymerization temperature in the later phase of the reaction is desirable because it provides a more efficient process. In addition, there is less residual ester monomer to remove and, consequently, less complex pollution control facilities are required. Polymerization using this programmed temperature sequence and conversion control method results in production of a colorless product which has excellent initial polymer color and which does not discolor with time.

A further distinguishing feature of the present process relates to the point in the process at which the monomers are introduced. Specifically, in the present process, essentially all the monomers are introduced to the reactor prior to initiation of polymerization. The polymerization then proceeds and no further introduction of ester monomer is required. Preferably, no further addition of even minor quantities of ester monomer takes place. It has been found that if the programmed temperature sequence of the present invention is employed it is not necessary to resort to a multi-stage process to produce a colorless product. Consequently, extra process steps are eliminated, for example, stripping of monomers from the reaction mixture following the copolymerization stage and addition of further ester monomer to complete the grafting reaction. Thus, the present process provides an efficient copolymerization method which permits short cycle times, uncomplicated reaction schemes, and simplified comonomer addition facilities. Moreover, the emulsion is not subjected to shear and thermal stresses which would cause discoloration.

Once the polymerization has proceeded to a point at which at least 95 wt. % ester has reacted, the polymerization is completed by short-stopping with an agent such as phenothiazine, 4-tert-butylcatechol, 4,4'-thiobis(6-tert-butyl-m-cresol), trisnonylphenyl phosphite, or N,N'-diethylhydroxylamine. Unreacted monomer is then removed and the products may be isolated, generally on a freeze roll. If the compositions are to be used as latexes, additional components such as tackifying resins, zinc oxide, and antioxidants may be added at this point.

The products prepared by the process of the present invention may be used in applications such as power transmission belts, hoses, CVJ boots, and engine mounts. However, they are especially suited for use as aqueous latex adhesives and it is thus preferable not to isolate the polymer products, but to use the latexes directly.

EXAMPLES

The following examples, wherein all parts are by weight unless otherwise specified, illustrate several embodiments of the invention.

EXAMPLE 1

A mixture of 85 parts chloroprene, 15 parts ethyl methacrylate, 0.4 parts dodecyl mercaptan, 0.1 parts hydroxyethyl methacrylate, and 2.58 parts oleic acid was emulsified with a solution of 102.3 parts water, 2.0 parts 60% triethanolammonium dodecylbenzene sulfonate, and 1.40 parts 87.7% potassium hydroxide. The emulsion was cooled to 10° C. Six parts of a 10% aqueous solution of sodium sulfite was added, followed by dropwise addition of a 5% aqueous solution of potassium persulfate. Addition continued until the specific gravity of the emulsion reached 1.078 and gas chromatographic analysis of the emulsion indicated greater than 98% monomer conversion. At this point 50% of the methacrylate monomer had copolymerized. The temperature of the emulsion was then raised to 48° C. and 2.5 parts of a 10% sodium sulfite solution was added. Dropwise addition of potassium persulfate solution was continued until no further increase in specific gravity was observed. A total of 7.26 parts of 5% persulfate was used. At that point over 99% of the chloroprene had polymerized and 91% of the ethyl methacrylate had polymerized. An 0.8 part sample of an aqueous emulsion containing 28% trisnonylphenyl phosphite, 2.9% oleic acid, 5% bis(6-t-butyl-3-methyl)phenyl sulfide, 9.2% of 1N sodium hydroxide solution, and 54.2% demineralized water was then added. The emulsion was steam stripped to remove trace quantities of ethyl methacrylate. The resulting emulsion was divided into two portions.

The first portion was tested for adhesivity without isolation of the dry polymer. A 95 part sample of the latex was mixed with a conventional aqueous based adhesive formulation which included 5 parts epoxy resin crosslinker and 5 parts Baybond ® 116 water dispersible isocyanates The adhesive was applied brushed onto 2.5×15 cm strips of 5 mm thick Neolite, 2 mm thick polyvinyl chloride, and 2 mm thick leather. The strips were contacted under 30 lbs pressure (0.2MPa). Adhesive tear strengths, as determined according to ASTM D413 were 4-18 pli (0.7-3.2 kN/m) after 7 days at room temperature. The results are indicative of a high degree of resistance to plasticizer migration. Moreover, the tear strengths are at least comparable to bond strengths of adhesives prepared by the solution process.

The second portion of the emulsion was acidified to pH 7.5 with a 10% aqueous solution of acetic acid. The graft copolymer was isolated on a freeze roll and it was air dried at 100° C. An 18% solids solution of the resulting white polymer in toluene had a Brookfield viscosity of 808 cP. The polymer was used to prepare an adhesive solution in an organic solvent. The solution contained 17.7%% polymer solids, 27.2% methyl ethyl ketone, 54.6% toluene, 0.3% Wingstay L ® antioxidant. The adhesive was brushed onto a series of 1.5×15 cm strips of 5 mm thick Neolite, 2 mm thick polyvinyl chloride, and 2 mm thick canvas. The polyvinyl chloride strips were bonded to the Neolite strips by contact under 30 lbs pressure (0.2 MPa). After one minute the average bond strength was 3.4 pli (0.6 kN/m) as determined according to ASTM D413. Canvas to canvas bond strengths were 10.5, 23.3 and 28.5 pli (1.8, 4.1, and 5.0 kN/m) after 10 minutes, 1 day, and 7 days, respectively, at room temperature.

EXAMPLE 2

A mixture of 85 parts chloroprene, 15 parts ethyl methacrylate, 0.4 parts dodecyl mercaptan, 0.1 parts hydroxyethyl methacrylate, and 2.58 parts oleic acid was emulsified with a solution of 102.3 parts water, 2.0 parts 60% triethanolammonium dodecylbenzene sulfonate, and 1.40 parts 87.7% potassium hydroxide. The emulsion was cooled to 10° C. Six parts of a 10% aqueous solution of sodium sulfite was added, followed by dropwise addition of a 5% aqueous solution of potassium persulfate. Addition continued until the specific gravity of the emulsion reached 1.087. At this point 70% of the methacrylate monomer had copolymerized. The temperature of the emulsion was then raised to 45° C. and 2.5 parts of a 10% sodium sulfite solution was added. Dropwise addition of potassium persulfate solution was continued until no further increase in specific gravity was observed. A total of 9.0 parts of 5% persulfate was used. At that point over 99% of the chloroprene had polymerized and 96% of the ethyl methacrylate had polymerized. An 0.8 part sample of an aqueous emulsion containing 28% trisnonylphenyl phosphite, 2.9% oleic acid, 5% bis(6-t-butyl-3-methyl)phenyl sulfide, 9.2% of 1N sodium hydroxide solution, and 54.2% demineralized water was then added. The emulsion was steam stripped to remove trace quantities of ethyl methacrylate. The resulting emulsion was acidified to pH 7.5 with a 10% aqueous solution of acetic acid.

EXAMPLE 3

A mixture of 50 parts chloroprene, 50 parts methyl methacrylate, and 0.4 parts dodecyl mercaptan was emulsified with a solution of 110 parts water, 0.3 parts sodium sulfite, 5 parts 60% triethanolammonium dodecylbenzene sulfonate, 0.3 parts 87.6% potassium hydroxide, and 1.0 parts Tergitol/NP-10 ® surfactant. The emulsion was cooled to 15° C. A 4% aqueous solution of potassium persulfate was added dropwise until the specific gravity of the emulsion reached 1.040. At this point 45% of the methacrylate monomer had copolymerized. The temperature of the emulsion was then raised to 48° C. and dropwise addition of potassium persulfate solution was continued until no further increase in specific gravity was observed. A total of 4.2 parts of 5% persulfate was used. At that point over 99% of the chloroprene had polymerized and 99% of the methyl methacrylate had polymerized.

EXAMPLE 4

A mixture of 80 parts chloroprene, 20 parts methyl methacrylate, and 0.6 parts dodecyl mercaptan was emulsified with a solution of 110 parts water, 0.3 parts sodium sulfite, 5 parts 60% triethanolammonium dodecylbenzene sulfonate, 0.28 parts 87.6% potassium hydroxide, and 1 part Tergitol/NP- 10 ® surfactant. The emulsion was cooled to 15° C. A 4% aqueous solution of potassium persulfate was added dropwise until the specific gravity of the emulsion reached 1.040. At this point approximately 45% of the methacrylate monomer had copolymerized. The temperature of the emulsion was then raised to 48° C. and dropwise addition of potassium persulfate solution was continued until no further increase in specific gravity was observed. A total of 2.61 parts of 4% persulfate was used. At that point over 99% of the chloroprene had polymerized and 99% of the methyl methacrylate had polymerized.

EXAMPLE 5

A mixture of 80 parts chloroprene, 20 parts n-butyl methacrylate, and 0.6 parts dodecyl mercaptan was emulsified with a solution of 110 parts water, 0.3 parts sodium sulfite, 5 parts 60% triethanolammonium dodecylbenzene sulfonate, 0.28 parts 87.6% potassium hydroxide, and 1 part Tergitol-NP- 10 ® surfactant. The emulsion was cooled to 15° C. A 4% aqueous solution of potassium persulfate was added dropwise until the specific gravity of the emulsion reached 1.040. At this point approximately 45% of the methacrylate monomer had copolymerized. The temperature of the emulsion was then raised to 48° C. and dropwise addition of potassium persulfate solution was continued until no further increase in specific gravity was observed. A total of 3.6 parts of 4% persulfate was used. At that point over 99% of the chloroprene had polymerized and 99% of the n-butyl methacrylate had polymerized.

I claim:

1. A process for preparation of an addition polymer consisting essentially of copolymerized backbone units of 2-chloro-1,3-butadiene and at least one ester monomer of the formula

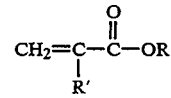

wherein R' is H or an unbranched alkyl radical having 1–4 carbon atoms, and R is an alkyl, hydroxyalkyl, or cycloalkyl radical having 1–12 carbon atoms, with additional units of said ester monomer or monomers grafted onto the copolymer backbone, said process consisting essentially of a) preparing an aqueous emulsion of a mixture consisting essentially of said ester monomer or monomers and 2-chloro-1,3-butadiene, in a weight ratio of 5–100 parts total ester monomer per 100 parts 2-chloro-1,3-butadiene, in an inert atmosphere, in the presence of a free radical generator and an anionic surfactant, and at a temperature no greater than 25° C.;

b) allowing polymerization of said ester monomer or monomers and 2-chloro-1,3-butadiene to proceed at a temperature no greater than 25° C. until 35–90 weight percent of said total ester monomer has copolymerized;

c) raising the temperature of the emulsion to at least 35° C.; and d) continuing the polymerization at a temperature of at least 35° C., until at least 90% of said total ester monomer has reacted;

provided that no substantial quantity of any additional monomer is added to the aqueous emulsion after initiation of polymerization.

2. The process of claim 1 wherein step a) is carried out at a temperature of 5°–20° C.

3. The process of claim 1 wherein step d) is carried out at a temperature between 45°–55° C.

4. The process of claim 1 wherein step b) is allowed to proceed until 40–60% of the ester monomer has copolymerized.

5. The process of claim 1 wherein step d) is allowed to continue until at least 99% of the total ester monomer has reacted.

6. The process of claim 1 wherein the weight ratio of total ester monomer to 2-chloro-1,3-butadiene in step a) is 10–50 parts total ester monomer per 100 parts 2-chloro-1,3-butadiene.

7. The process of claim 1 wherein the ester monomer is methyl methacrylate.

8. The process of claim 1 wherein the ester monomer is ethyl methacrylate.

9. The process of claim 1 wherein the ester monomer is n-butyl methacrylate.

10. The process of claim 1 wherein a copolymerizable monomer selected from the group consisting of 2,3-dichloro-1,3-butadiene, styrene, acrylonitrile, 1,3-butadiene, and methacrylic acid is additionally present in step a).

11. A process for preparation of an addition polymer consisting of copolymerized backbone units of 2-chloro-1,3-butadiene and at least one ester monomer of the formula

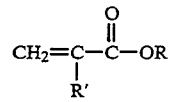

wherein R' is H or an unbranched alkyl radical having 1–4 carbon atoms, and R is an alkyl, hydroxyalkyl, or cycloalkyl radical having 1–12 carbon atoms, with additional units of said ester monomer or monomers grafted onto the copolymer backbone, said process consisting essentially of a) preparing an aqueous emulsion of a mixture consisting of said ester monomer or monomers and 2-chloro-1,3-butadiene, in a weight ratio of 5–100 parts total ester monomer per 100 parts 2-chloro-1,3-butadiene, in an inert atmosphere, in the presence of a free radical generator and an anionic surfactant, and at a temperature no greater than 25° C.;

b) allowing polymerization of said ester monomer or monomers and 2-chloro-1,3-butadiene to proceed at a temperature no greater than 25° C. until 35–90 weight percent of said total ester monomer has copolymerized;

c) raising the temperature of the emulsion to at least 35° C.; and d) continuing the polymerization at a temperature of at least 35° C. until at least 90% of said total ester monomer has reacted;

provided that no substantial quantity of any additional monomer is added to the aqueous emulsion after initiation of polymerization.

* * * * *